United States Patent
Kakeda et al.

(10) Patent No.: US 12,233,866 B2
(45) Date of Patent: Feb. 25, 2025

(54) VEHICLE CONTROL DEVICE, VEHICLE CONTROL METHOD, AND NON-TRANSITORY COMPUTER-READABLE RECORDING MEDIUM RECORDING PROGRAM

(71) Applicant: Honda Motor Co., Ltd., Tokyo (JP)

(72) Inventors: Takafumi Kakeda, Saitama (JP); Masashi Ogawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 440 days.

(21) Appl. No.: 17/503,352

(22) Filed: Oct. 17, 2021

(65) Prior Publication Data

US 2022/0161794 A1 May 26, 2022

(30) Foreign Application Priority Data

Nov. 26, 2020 (JP) ................. 2020-196085

(51) Int. Cl.
*B60W 30/12* (2020.01)
*G06V 20/56* (2022.01)

(52) U.S. Cl.
CPC ........... *B60W 30/12* (2013.01); *G06V 20/588* (2022.01); *B60W 2420/403* (2013.01); *B60W 2420/408* (2024.01); *B60W 2552/53* (2020.02)

(58) Field of Classification Search
CPC ............ B60W 30/12; B60W 2420/42; B60W 2420/52; B60W 2552/53;

(Continued)

(56) References Cited

U.S. PATENT DOCUMENTS

2012/0057757 A1* 3/2012 Oyama ................ G06V 20/588
    382/104
2014/0050362 A1* 2/2014 Park ..................... G06V 20/588
    382/104

(Continued)

FOREIGN PATENT DOCUMENTS

JP    2008197863    8/2008
JP    2008249639    10/2008

(Continued)

OTHER PUBLICATIONS

"Office Action of Japan Counterpart Application" with English translation thereof, issued on Aug. 2, 2022, p. 1-p. 14.

*Primary Examiner* — Ig T An
*Assistant Examiner* — Stephanie T Su
(74) *Attorney, Agent, or Firm* — JCIPRNET

(57) ABSTRACT

A vehicle control device includes: a recognition part recognizing a first road marking line on a first side of a lane traveled by a vehicle; an obtaining part obtaining information on a second road marking line on the first side of the lane from map information; and a support part that executes a support processing for preventing the vehicle from deviating from a road marking line when a probability that the vehicle deviates from the road marking line is greater than or equal to a predetermined degree. When a degree of matching between a first position of the first road marking line and a second position of the second road marking line is less than or equal to a first threshold value, the support part suppresses execution of the support processing for preventing the vehicle from deviating from a road marking line on the first side.

5 Claims, 13 Drawing Sheets

| | (1) The shape of the camera road marking line and the map information match | (2) The shape of the road marking line on the right side and the map information do not match | (3) The shape of the road marking line on the left side and the map information do not match | (4) The shapes of the road marking lines on the left and right sides and the map information do not match |
|---|---|---|---|---|
| Event example | Normal state | Camera road marking line (right side) misrecognition | Camera road marking line (left side) misrecognition | It is estimated that the road marking lines have been redrawn |
| —— Camera road marking line<br>- - - Map road marking line | | | | |
| Use of camera road marking line (left) | ○ | ○ | × | ○ |
| Use of camera road marking line (right) | ○ | × | ○ | ○ |
| Use of map information | ○ | ○ | ○ | ○ |

(58) Field of Classification Search
CPC ....... B60W 2554/801; B60W 2556/50; B60W 60/0059; B60W 40/06; B60W 60/001; G06V 20/588; G01C 21/30
See application file for complete search history.

(56) References Cited

U.S. PATENT DOCUMENTS

| | | | |
|---|---|---|---|
| 2016/0259814 A1* | 9/2016 | Mizoguchi | G06F 16/29 |
| 2018/0134290 A1* | 5/2018 | Kataoka | B62D 15/025 |
| 2022/0219692 A1* | 7/2022 | Taniguchi | B60W 30/12 |

FOREIGN PATENT DOCUMENTS

| | | |
|---|---|---|
| JP | 2017105383 | 6/2017 |
| JP | 2018189900 | 11/2018 |
| JP | 2019046363 | 3/2019 |
| JP | 2019152896 | 9/2019 |
| JP | 2020003463 | 1/2020 |

* cited by examiner

| Item | Is the road marking line recognized? | | Is the degree of matching with the road marking line of the map information greater than or equal to the threshold value? | | Can the support can be operated? | |
|---|---|---|---|---|---|---|
| | Road marking line on the left side | Road marking line on the right side | Road marking line on the left side | Road marking line on the right side | Road marking line on the left side | Road marking line on the right side |
| (1) | ○ | ○ | ○ | ○ | ○ | ○ |
| (2) | ○ | ○ | ○ | × | ○ | × |
| (3) | ○ | ○ | × | ○ | × | ○ |
| (4) | ○ | × | × | × | ○ | ○ |
| (5) | ○ | × | don't care | | ○ | × |
| (6) | × | ○ | don't care | | × | ○ |
| (7) | × | × | don't care | | × | × |

FIG. 5

| | (1) The shape of the camera road marking line and the map information match | (2) The shape of the road marking line on the right side and the map information do not match | (3) The shape of the road marking line on the left side and the map information do not match | (4) The shapes of the road marking lines on the left and right sides and the map information do not match |
|---|---|---|---|---|
| Event example | Normal state | Camera road marking line (right side) misrecognition | Camera road marking line (left side) misrecognition | It is estimated that the road marking lines have been redrawn |
| Camera road marking line ——  Map road marking line ---- | | | | |
| Use of camera road marking line (left) | ○ | ○ | × | ○ |
| Use of camera road marking line (right) | ○ | × | ○ | ○ |
| Use of map information | ○ | ○ | ○ | ○ |

FIG. 6

| | (5A) The road marking line on the right side cannot be recognized. The road marking line on the left side is used without considering the map information | (6A) The road marking line on the left side cannot be recognized. The road marking line on the right side is used without considering the map information | (5B) The road marking line on the right side cannot be recognized. The road marking line on the left side is used considering the map information | (6B) The road marking line on the left side cannot be recognized. The road marking line on the right side is used without considering the map information |
|---|---|---|---|---|
| Event example<br>Camera road marking line ——<br>Map road marking line ----- | ----- / ----- | ----- / ----- | ----- / ----- | ----- / ----- |
| Use of camera road marking line (left) | ○ | | | |
| Use of camera road marking line (left) | | ○ | ○ | ○ |
| Use of map information | | | | |

FIG. 7

| Determination target | Matching condition Last time non-match → This time match | Non-matching condition Last time match → This time non-match |
|---|---|---|
| A. Weighted average of azimuth differences | ≤ $\theta 1$ deg | > $\theta 3$ deg |
| B. Forward gaze angle difference | ≤ $\theta 2$ deg | > $\theta 4$ deg |
| C. Weighted average of lateral position differences | ≤ $d1$ m | > $d2$ m |

VEHICLE CONTROL DEVICE, VEHICLE CONTROL METHOD, AND NON-TRANSITORY COMPUTER-READABLE RECORDING MEDIUM RECORDING PROGRAM

CROSS-REFERENCE TO RELATED APPLICATION

This application claims the priority benefit of Japan application serial no. 2020-196085, filed on Nov. 26, 2020. The entirety of the above-mentioned patent application is hereby incorporated by reference herein and made a part of this specification.

BACKGROUND

Technical Field

The disclosure relates to a vehicle control device, a vehicle control method, and a non-transitory computer-readable recording medium recording a program.

Description of Related Art

Conventionally, an in-vehicle traveling environment recognition device that recognizes the external environment surrounding the vehicle and issues a lane deviation alarm based on the recognition result has been disclosed (see, for example, Patent Document 1). When this in-vehicle traveling environment recognition device can detect only a lane marker on one side from the photographed image, the lane deviation alarm is issued based on the lane marker on one side and the lane width stored in the map database.

RELATED ART

Patent Document

[Patent Document 1] Japanese Laid-open No. 2008-197863

However, with the above technology, there are cases where the vehicle cannot be appropriately controlled according to the recognition results of various environments and surroundings.

The disclosure has been made in consideration of such circumstances, and provides a vehicle control device, a vehicle control method, and a non-transitory computer-readable recording medium recording a program capable of controlling the vehicle more appropriately.

SUMMARY

A vehicle control device, a vehicle control method, and a non-transitory computer-readable recording medium recording a program according to the disclosure adopt the following configurations.

(1): A vehicle control device includes: a recognition part that recognizes a first road marking line on a first side of a lane in which a vehicle travels from an image photographed by a photographing part that photographs surroundings of the vehicle; an obtaining part that obtains information on a second road marking line on the first side of the lane in which the vehicle travels from map information; and a support part that executes a support processing of providing a support for preventing the vehicle from deviating from a road marking line when a probability that the vehicle deviates from the road marking line is greater than or equal to a predetermined degree. When a degree of matching between a first position of the first road marking line on the first side recognized by the recognition part and a second position of the second road marking line on the first side obtained by the obtaining part is less than or equal to a first threshold value, the support part suppresses execution of the support processing of providing the support for preventing the vehicle from deviating from a road marking line on the first side.

BRIEF DESCRIPTION OF THE DRAWINGS

FIG. 5 is a diagram (No. 1) for illustrating conditions for whether the support can be operated.

FIG. 6 is a diagram (No. 2) for illustrating conditions for whether the support can be operated.

FIG. 7 is a diagram (No. 3) for illustrating conditions for whether the support can be operated.

Figure 1:
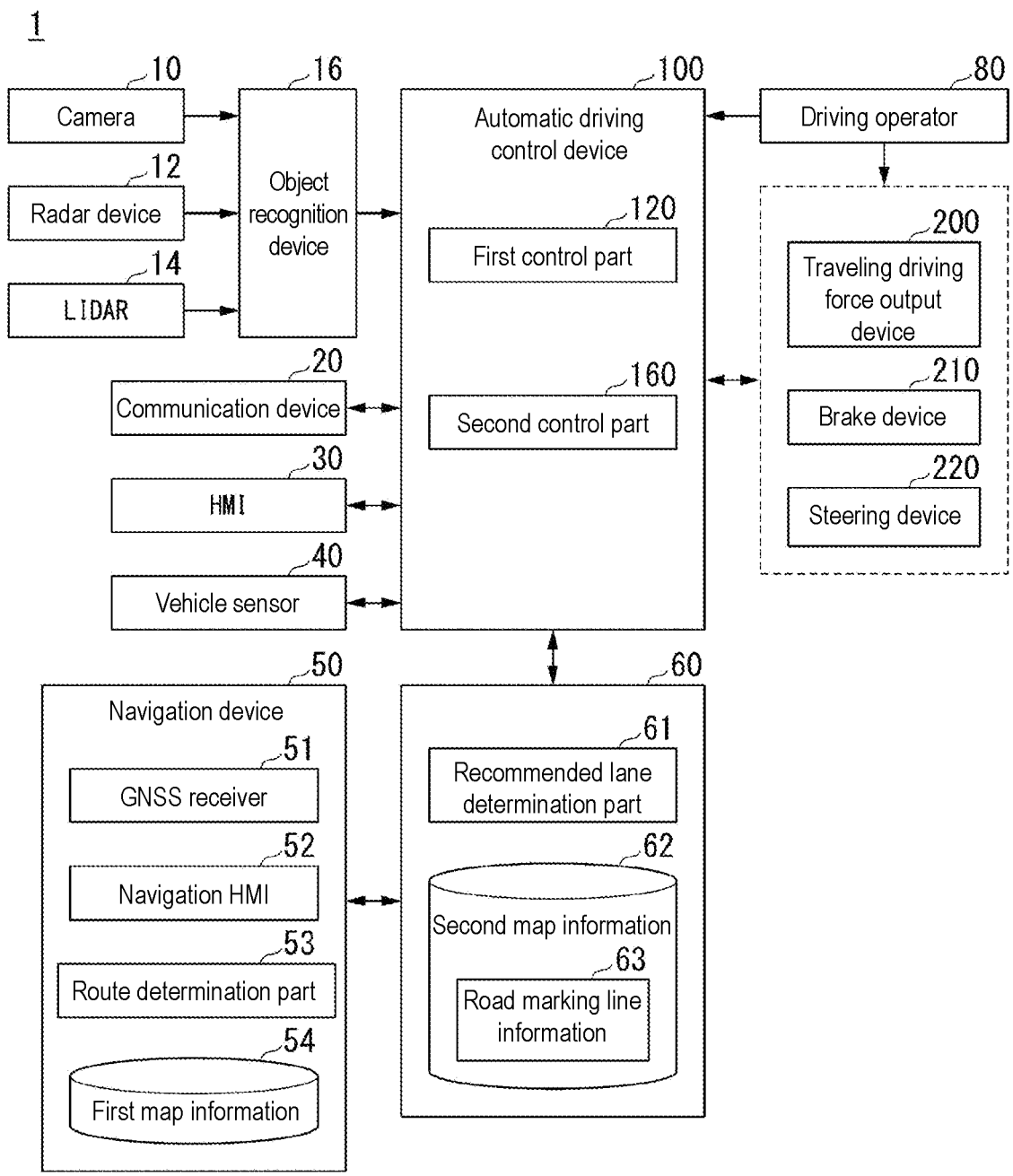
FIG. 1 is a configuration diagram of a vehicle system 1 using a vehicle control device according to the embodiment.

DESCRIPTION OF THE EMBODIMENTS (2): In the aspect of the above (1) of the vehicle control device, the recognition part further recognizes a third road marking line on a second side opposite to the first side of the lane; the obtaining part further obtains information on a fourth road marking line on the second side from the map information; when the degree of matching between the first position of the first road marking line on the first side and the second position of the second road marking line on the first side is less than or equal to the first threshold value, and a degree of matching between a third position of the third road marking line on the second side and a fourth position of the fourth road marking line on the second side is greater than or equal to a second threshold value, the support part does not execute the support processing of providing the support for preventing the vehicle from deviating from the road marking line on the first side; and when a probability that the vehicle deviates from the third road marking line on the second side is greater than or equal to a predetermined degree, the support part executes the support processing of providing the support for preventing the vehicle from deviating from the third road marking line based on the third road marking line.

(3): In the aspect of the above (1) or (2), when the obtaining part cannot obtain the information on a road marking line of the lane, the support part provides the support for preventing the vehicle from deviating from the road marking line based on the road marking line recognized by the recognition part.

(4): In the aspect of any of the above (1) to (3), the recognition part further recognizes a third road marking line on a second side opposite to the first side of the lane; the obtaining part further obtains information on a fourth road marking line on the second side from the map information; and when the degree of matching between the first position of the first road marking line on the first side and the second position of the second road marking line on the first side is less than or equal to the first threshold value, and a degree of matching between a third position of the third road marking line on the second side and a fourth position of the fourth road marking line on the second side is less than or equal to a second threshold value, when a probability that the vehicle deviates from the first road marking line on the first side is greater than or equal to a predetermined degree, the support part executes the support processing of providing the support for preventing the vehicle from deviating from the first road marking line based on the first road marking line, and when a probability that the vehicle deviates from the third road marking line on the second side is greater than or equal to a predetermined degree, the support part executes the support processing of providing the support for preventing the vehicle from deviating from the third road marking line based on the third road marking line.

(5): In the aspect of any of the above (1) to (4), the recognition part recognizes one or both of the first road marking line on the first side and a third road marking line on a second side opposite to the first side of the lane; the obtaining part obtains one or both of the information on the second road marking line on the first side and information on a fourth road marking line on the second side from the map information; when the recognition part recognizes the first road marking line and the third road marking line, the support part uses the second position of the second road marking line or a fourth position of the fourth road marking line in addition to a recognition result of the recognition part to execute the support processing of providing the support for preventing the vehicle from deviating from the road marking line; and when the recognition part does not recognize the first road marking line or the third road marking line, the support part does not use the second position of the second road marking line or the fourth position of the fourth road marking line and uses the recognition result of the recognition part to execute the support processing of providing the support for preventing the vehicle from deviating from the road marking line.

(6): In the aspect of any of the above (1) to (5), the support part determines the degree of matching between the first position of the first road marking line and the second position of the second road marking line based on a difference between an azimuth of the first position and an azimuth of the second position, an angle formed by the first road marking line and the second road marking line, and a lateral distance between the first road marking line and the second road marking line.

(7): In a vehicle control method according to an aspect of the disclosure, a computer: recognizes a first road marking line on a first side of a lane in which a vehicle travels from an image photographed by a photographing part that photographs surroundings of the vehicle; obtains information on a second road marking line on the first side of the lane in which the vehicle travels from map information; executes a support processing of providing a support for preventing the vehicle from deviating from a road marking line when a probability that the vehicle deviates from the road marking line is greater than or equal to a predetermined degree; and when a degree of matching between a first position of the recognized first road marking line on the first side and a second position of the obtained second road marking line on the first side is less than or equal to a first threshold value, suppresses execution of the support processing of providing the support for preventing the vehicle from deviating from a road marking line on the first side.

(8): In a non-transitory computer-readable recording medium recording a program according to an aspect of the disclosure, a computer is made to perform: a processing of recognizing a first road marking line on a first side of a lane in which a vehicle travels from an image photographed by a photographing part that photographs surroundings of the vehicle; a processing of obtaining information on a second road marking line on the first side of the lane in which the vehicle travels from map information; a processing of executing a support processing of providing a support for preventing the vehicle from deviating from a road marking line when a probability that the vehicle deviates from the road marking line is greater than or equal to a predetermined degree; and when a degree of matching between a first position of the recognized first road marking line on the first side and a second position of the obtained second road marking line on the first side is less than or equal to a first threshold value, a processing of suppressing execution of the support processing of providing the support for preventing the vehicle from deviating from a road marking line on the first side.

According to (1), (2), (5), (7), and (8), the vehicle control device suppresses the execution of the support processing for preventing the vehicle from deviating from the road marking line on the first side. In this way, the vehicle can be controlled more appropriately.

According to (3), even when the vehicle control device cannot obtain the information on the road marking line, the support processing can be executed. Therefore, the convenience for the occupant is improved.

According to (4), even when the degree of matching between the first position of the first road marking line on the first side and the second position of the second road marking line on the first side is less than or equal to the first threshold value, and the degree of matching between the third position of the third road marking line on the second side and the fourth position of the fourth road marking line on the second side is less than or equal to a second threshold value, the support processing can be executed. Therefore, the convenience for the occupant is improved.

According to (6), the vehicle control device can more accurately determine the degree of matching between the first position of the first road marking line and the second position of the second road marking line.

Hereinafter, embodiments of a vehicle control device, a vehicle control method, and a non-transitory computer-readable recording medium recording a program of the disclosure will be described with reference to the drawings.

First Embodiment

[Overall Configuration]

FIG. 1 is a configuration diagram of a vehicle system 1 using a vehicle control device according to the embodiment. The vehicle on which the vehicle system 1 is mounted is, for example, a vehicle such as a two-wheeled vehicle, a three-wheeled vehicle, or a four-wheeled vehicle, and the drive source thereof is an internal combustion engine such as a diesel engine or a gasoline engine, an electric motor, or a combination thereof. The electric motor operates by using the electric power generated by a generator connected to the internal combustion engine or the electric power generated by a secondary battery or a fuel cell.

The vehicle system 1 includes, for example, a camera 10, a radar device 12, a light detection and ranging (LIDAR) 14, an object recognition device 16, a communication device 20, an human machine interface (HMI) 30, a vehicle sensor 40, a navigation device 50, a map positioning unit (MPU) 60, a driving operator 80, an automatic driving control device 100, a traveling driving force output device 200, a brake device 210, and a steering device 220. These devices and equipment are connected to one another by a multiplex communication line such as a controller area network (CAN) communication line, a serial communication line, a wireless communication network, or the like. Further, the configuration shown in FIG. 1 is merely an example, and a part of the configuration may be omitted or another configuration may be added.

The camera 10 is, for example, a digital camera using a solid-state photographing device such as a charge coupled device (CCD) or a complementary metal oxide semiconductor (CMOS). The camera 10 is attached to any position of the vehicle (hereinafter referred to as the vehicle M) on which the vehicle system 1 is mounted. When photographing the front, the camera 10 is attached to the upper part of the front windshield, the back surface of the rearview mirror, or the like. The camera 10 cyclically and repeatedly photographs the periphery of the vehicle M, for example. The camera 10 may be a stereo camera.

The radar device 12 radiates radio waves such as millimeter waves in the periphery of the vehicle M, and detects radio waves (reflected waves) reflected by an object to detect at least the position (distance and orientation) of the object. The radar device 12 is attached to any position of the vehicle M. The radar device 12 may detect the position and speed of the object by the frequency modulated continuous wave (FM-CW) method.

The LIDAR 14 irradiates the periphery of the vehicle M with light (or an electromagnetic wave having a wavelength close to that of light) and measures the scattered light. The LIDAR 14 detects the distance to a target based on the time from light emission to light reception. The emitted light is, for example, a pulsed laser beam. The LIDAR 14 is attached to any position of the vehicle M.

The object recognition device 16 performs sensor fusion processing on the detection results of a part or all of the camera 10, the radar device 12, and the LIDAR 14, and recognizes the position, type, speed, and the like of the object. The object recognition device 16 outputs the recognition result to the automatic driving control device 100. The object recognition device 16 may output the detection results of the camera 10, the radar device 12, and the LIDAR 14 to the automatic driving control device 100 as they are. The object recognition device 16 may be omitted from the vehicle system 1.

The communication device 20 communicates with other vehicles existing in the periphery of the vehicle M, or communicates with various server devices via a radio base station by using, for example, a cellular network, a Wi-Fi network, Bluetooth (registered trademark), dedicated short range communication (DSRC), or the like.

The HMI 30 presents various information to an occupant of the vehicle M and accepts input operations by the occupant. The HMI 30 includes various display devices, speakers, buzzers, touch panels, switches, keys and the like.

The vehicle sensor 40 includes a vehicle speed sensor that detects the speed of the vehicle M, an acceleration sensor that detects the acceleration, a yaw rate sensor that detects the angular velocity around the vertical axis, an orientation sensor that detects the orientation of the vehicle M, and the like.

The navigation device 50 includes, for example, a global navigation satellite system (GNSS) receiver 51, a navigation HMI 52, and a route determination part 53. The navigation device 50 holds first map information 54 in a storage device such as a hard disk drive (HDD) or a flash memory. The GNSS receiver 51 specifies the position of the vehicle M based on the signal received from the GNSS satellite. The position of the vehicle M may be specified or complemented by an inertial navigation system (INS) using the output of the vehicle sensor 40. The navigation HMI 52 includes display devices, speakers, touch panels, keys, and the like. The navigation HMI 52 may be partially or wholly shared with the above-mentioned HMI 30. The route determination part 53, for example, refers to the first map information 54 to determine a route (hereinafter referred to as the route on the map) from the position of the vehicle M specified by the GNSS receiver 51 (or any input position) to a destination input by the occupant using the navigation HMI 52. The first map information 54 is, for example, information in which the road shape is expressed by links indicating roads and nodes connected by the links. The first map information 54 may include the road curvature, point of interest (POI) information, and the like. The route on the map is output to the MPU 60. The navigation device 50 may provide route guidance using the navigation HMI 52 based on the route on the map. The navigation device 50 may be realized by, for example, the function of a terminal device such as a smartphone or a tablet terminal owned by the occupant. The navigation device 50 may transmit the current position and the destination to the navigation server via the communication device 20 and obtain a route equivalent to the route on the map from the navigation server.

The MPU 60 includes, for example, a recommended lane determination part 61, and holds second map information 62 in a storage device such as an HDD or a flash memory. The recommended lane determination part 61 divides the route on the map provided by the navigation device 50 into multiple blocks (for example, every 100 m with respect to the vehicle traveling direction), and refers to the second map information 62 to determine the recommended lane for each block. The recommended lane determination part 61 determines which lane from the left to drive. When a branch point exists on the route on the map, the recommended lane determination part 61 determines the recommended lane so that the vehicle M can travel on a reasonable route to proceed to the branch destination.

The second map information 62 is more accurate map information than the first map information 54. The second map information 62 includes, for example, road marking line information 63. The road marking line information 63 includes, for example, information on the center of the lane, information on the boundary of the lane, and the like. The information on the boundary of the lane is the position coordinates of the road marking lines forming the lane, the width between the road marking lines, and the like. Further, the second map information 62 may include road information, traffic regulation information, address information (address/zip code), facility information, telephone number information, and the like. The second map information 62 may be updated at any time by the communication device 20 communicating with another device. The second map information 62 stores information indicating the position and range of the zebra zone (conduction zone). The zebra zone is a road marking for guiding the traveling of a vehicle. The zebra zone is, for example, a marking represented by a striped pattern.

The driving operator 80 includes, for example, an accelerator pedal, a brake pedal, a shift lever, a steering wheel, a steering wheel variant, a joystick, and other operators. A sensor for detecting the amount of operation or the presence or absence of operation is attached to the driving operator 80, and the detection result is output to a part or all of the automatic driving control device 100, the traveling driving force output device 200, the brake device 210, and the steering device 220.

The automatic driving control device 100 includes, for example, a first control part 120 and a second control part 160. The first control part 120 and the second control part 160 are realized by, for example, a hardware processor such as a central processing unit (CPU) executing a program (software). In addition, a part or all of these components may be realized by hardware (circuit part; including circuitry) such as a large scale integration (LSI), an application specific integrated circuit (ASIC), a field-programmable gate array (FPGA), or a graphics processing unit (GPU), or may be realized by collaboration between software and hardware. A program may be stored in advance in a storage device (a storage device including a non-transitory storage medium) such as an HDD or a flash memory of the automatic driving control device 100, or may be stored in a removable storage medium such as a DVD or a CD-ROM, and the storage medium (a non-transitory storage medium) may be installed in the HDD or the flash memory of the automatic driving control device 100 by being attached to the drive device. The automatic driving control device 100 is an example of the "vehicle control device."

Figure 2:
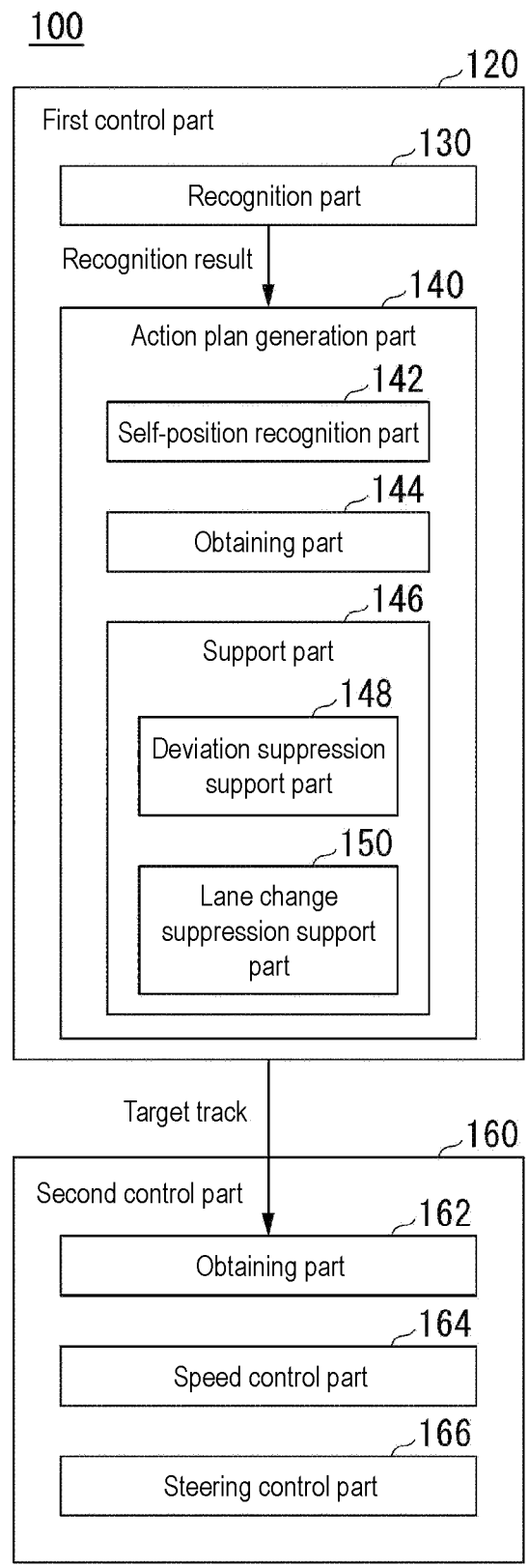
FIG. 2 is a functional configuration diagram of the first control part 120 and the second control part 160.

FIG. 2 is a functional configuration diagram of the first control part 120 and the second control part 160. The first control part 120 includes, for example, a recognition part 130 and an action plan generation part 140. The first control part 120, for example, realizes a function by artificial intelligence (AI) and a function by a model given in advance in parallel. For example, the function of "recognizing an intersection" may be executed in parallel with the recognition of an intersection by deep learning or the like and the recognition based on predetermined conditions (there are signals, road markings, and the like that can be pattern matched), and may be realized by scoring both ways and making a comprehensive evaluation. In this way, the reliability of automatic driving is ensured.

The recognition part 130 recognizes the position, speed, acceleration, and other states of an object in the periphery of the vehicle M based on the information input from the camera 10, the radar device 12, and the LIDAR 14 via the object recognition device 16. The position of the object is recognized as, for example, a position on absolute coordinates with a representative point (center of gravity, center of drive axis, or the like) of the vehicle M as the origin, and is used for control. The position of the object may be represented by a representative point such as the center of gravity or a corner of the object, or may be represented by a represented area. The "state" of the object may include the acceleration or jerk of the object, or the "behavioral state" (for example, whether it is changing lanes or is about to change lanes).

The recognition part 130 recognizes, for example, the lane (traveling lane) in which the vehicle M is traveling. For example, the recognition part 130 recognizes the traveling lane by comparing a road marking line pattern (for example, the arrangement of solid lines and broken lines) obtained from the second map information 62 and a road marking line pattern in the periphery of the vehicle M recognized from the image photographed by the camera 10. Further, the recognition part 130 may recognize the traveling lane by recognizing not only the road marking line but also the traveling road boundary (road boundary) including the road marking line, the road shoulder, the curb, the median strip, the guardrail, and the like. In this recognition, the position of the vehicle M obtained from the navigation device 50 and the processing result by the INS may be added. Further, the recognition part 130 also recognizes stop lines, obstacles, red lights, tollhouses, and other road events.

When recognizing the traveling lane, the recognition part 130 recognizes the position and posture of the vehicle M with respect to the traveling lane. The recognition part 130 may recognize, for example, the deviation of the reference point of the vehicle M from the center of the lane and the angle formed with respect to a line connecting the center of the lane in the traveling direction of the vehicle M as the relative position and posture of the vehicle M with respect to the traveling lane. Alternatively, the recognition part 130 may recognize the position of the reference point of the vehicle M with respect to any side end part (the road marking line or the road boundary) of the traveling lane as the relative position of the vehicle M with respect to the traveling lane.

The action plan generation part 140 generates a target track in which the vehicle M will automatically travel in the future (without relying on the driver's operation) so that in principle, the vehicle M can travel in the recommended lane determined by the recommended lane determination part 61, and is further able to respond to the conditions in the periphery of the vehicle M. The target track includes, for example, a speed element. For example, the target track is represented as a sequence of points (track points) to be reached by the vehicle M. The track point is a point to be reached by the vehicle M for each predetermined mileage (for example, about several meters) along the road, and separately, a target speed and a target acceleration for each predetermined sampling time (for example, about some tenths of a second) are generated as a part of the target track. Further, the track point may be a position to be reached by the vehicle M at the sampling time for each predetermined sampling time. In this case, the information of the target speed and the target acceleration is expressed by the interval of the track points.

The action plan generation part 140 may set an automatic driving event when generating the target track. The automatic driving event include a constant speed traveling event, a low speed following traveling event, a lane change event, a branching event, a merging event, a takeover event, and the like. The action plan generation part 140 generates the target track according to the activated event.

The action plan generation part 140 includes, for example, a self-position recognition part 142, an obtaining part 144, and a support part 146.

The self-position recognition part 142 collates the position of the vehicle M specified by the navigation device 50, the image photographed by the camera 10, the output of the orientation sensor included in the vehicle sensor 40, and the like with the second map information 62, and recognizes which road and which lane on the map the vehicle M is traveling. Further, the self-position recognition part 142 recognizes at which position the representative point of the vehicle M is located (hereinafter referred to as the lateral position) with respect to the width direction of the lane or the road based on the above-mentioned various information. The lateral position may be derived as an offset amount from one of the left and right road marking lines of the lane, or may be derived as an offset amount from the center of the lane. The self-position recognition part 142 recognizes how many degrees the traveling direction of the vehicle M at that time is inclined with respect to the extending direction of the lane (hereinafter referred to as the yaw angle) based on the above-mentioned various information.

After collating the position of the vehicle M specified by the navigation device 50, the image photographed by the camera 10, the output of the orientation sensor included in the vehicle sensor 40, and the like with the second map information 62, the self-position recognition part 142 outputs information indicating a matching failure to the action plan generation part 140 when they do not match with sufficient reliability. The "matching failure" may include the case where there is no map corresponding to the position of the vehicle M specified by the navigation device 50, or the case where all or a predetermined road marking line included in the road is not detected. As described above, the position where the vehicle M exists is recognized on the map. Hereinafter, the processing that the self-position recognition part 142 collates the position of the vehicle M specified by the navigation device 50, the image photographed by the camera 10, the output of the orientation sensor included in the vehicle sensor 40, and the like with the second map information 62 may be referred to as the "matching processing."

The obtaining part 144 obtains information on the road marking line of the lane in which the vehicle M travels from the map information (for example, the road marking line information 63). The obtaining part 144 obtains the position of the vehicle M recognized by the self-position recognition part 142 and the information on the road marking line around the position from the road marking line information 63. The information on the road marking line includes information such as the position and type (solid lines and broken lines) of the road marking line.

[Support Part]

The support part 146 provides a support for preventing the vehicle from deviating from the road marking line when the probability that the vehicle deviates from the road marking line is greater than or equal to a predetermined degree. Hereinafter, this processing may be referred to as the "support processing." That the probability that the vehicle M deviates from the lane is greater than or equal to a predetermined degree means that the vehicle M moves in a tendency to deviate from the lane and the relationship between the reference position (for example, the tire) of the vehicle M and the lane is a predetermined relationship (for example, the relationship that the reference position and the lane are close to each other). The support is to output an alarm or to automatically control the steering of the vehicle M. The alarm is a sound, an image, a vibration or the like that indicates to the driver that the vehicle M is likely to deviate from the lane, or a sound, an image, a vibration, or the like that urges the driver to control the vehicle M so as not to deviate from the lane. To automatically control the steering of the vehicle M is to automatically control the steering so that the vehicle M does not deviate from the lane or the vehicle M approaches the center side of the lane.

The support part 146 includes, for example, a deviation suppression support part 148 and a lane change suppression support part 150. The deviation suppression support part 148 suppresses the vehicle M from deviating from the lane when the probability that the vehicle M deviates from the lane is greater than or equal to a predetermined degree (hereinafter referred to as when the first condition is satisfied).

Figure 3:
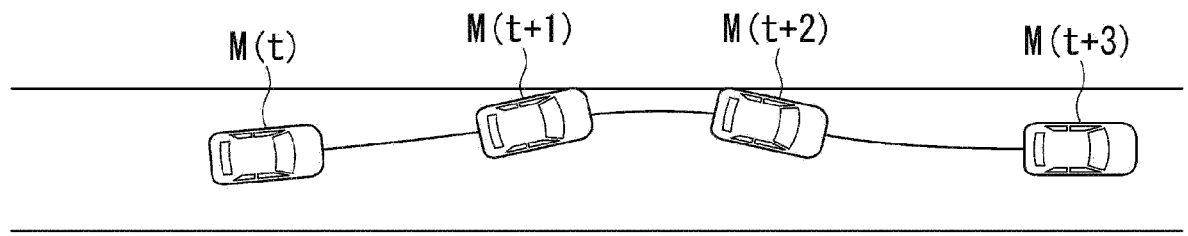
FIG. 3 is a diagram showing an example of a scene in which the deviation suppression support part 148 controls the vehicle M.

FIG. 3 is a diagram showing an example of a scene in which the deviation suppression support part 148 controls the vehicle M. The deviation suppression support part 148 causes the HMI 30 to output an alarm when the first condition is satisfied. Further, the deviation suppression support part 148 controls the steering so that the vehicle M moves toward the center of the lane when the first condition is satisfied. For example, the deviation suppression support part 148 controls the steering so that the vehicle M moves toward the center of the lane when the state in which the first condition is satisfied is not resolved after the alarm is output. The control executed by the deviation suppression support part 148 may be referred to as "road departure mitigation (RDM)."

The lane change suppression support part 150 suppresses the vehicle M from deviating from the lane when the probability that vehicle M will enter the adjacent lane is greater than or equal to a predetermined degree (for example, when it tries to change lanes to the adjacent lane) and when another vehicle exists behind the vehicle M and at a predetermined distance from the vehicle M in the adjacent lane (hereinafter referred to as when the second condition is satisfied). That the probability that the vehicle M will enter the adjacent lane is greater than or equal to a predetermined degree means that the vehicle M moves in a tendency to enter the adjacent lane and the relationship between the reference position (for example, the tire) of the vehicle M and the lane is a predetermined relationship (for example, the relationship that the reference position and the lane are close to each other).

Figure 4:
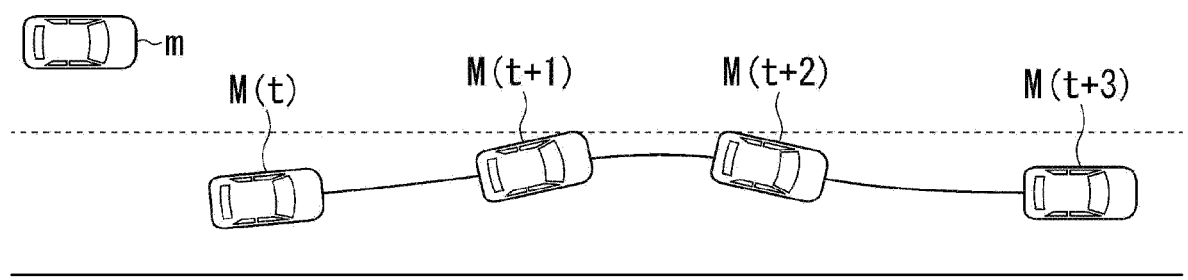
FIG. 4 is a diagram showing an example of a scene in which the lane change suppression support part 150 controls the vehicle M.

FIG. 4 is a diagram showing an example of a scene in which the lane change suppression support part 150 controls the vehicle M. The lane change suppression support part 150 causes the HMI 30 to output an alarm when the second condition is satisfied. Further, the deviation suppression support part 148 controls the steering so that the vehicle M moves toward the center of the lane when the second condition is satisfied. For example, the deviation suppression support part 148 controls the steering so that the vehicle M moves toward the center of the lane when the state in which the second condition is satisfied is not resolved after the alarm is output. The control executed by the lane change suppression support part 150 may be referred to as "lane change collision mitigation (LCCM)."

The second control part 160 controls the traveling driving force output device 200, the brake device 210, and the steering device 220 so that the vehicle M passes the target track generated by the action plan generation part 140 at the scheduled time.

The second control part 160 includes, for example, an obtaining part 162, a speed control part 164, and a steering control part 166. The obtaining part 162 obtains the information of the target track (orbit point) generated by the action plan generation part 140 and stores it in a memory (not shown). The speed control part 164 controls the traveling driving force output device 200 or the brake device 210 based on a speed element associated with the target track stored in the memory. The steering control part 166 controls the steering device 220 according to the curvature of the target track stored in the memory. The processing of the speed control part 164 and the steering control part 166 is realized by, for example, a combination of feedforward control and feedback control. For example, the steering control part 166 executes a combination of feedforward control according to the curvature of the road in front of the vehicle M and feedback control based on the deviation from the target track.

With reference back to FIG. 1, the traveling driving force output device 200 outputs to the drive wheel a traveling driving force (torque) for the vehicle to travel. The traveling driving force output device 200 includes, for example, a combination of an internal combustion engine, an electric motor, a transmission, and the like, and an electronic control unit (ECU) that controls them. The ECU controls the above configuration according to the information input from the second control part 160 or the information input from the driving operator 80.

The brake device 210 includes, for example, a brake caliper, a cylinder that transmits oil pressure to the brake caliper, an electric motor that generates oil pressure in the cylinder, and a brake ECU. The brake ECU controls the electric motor according to the information input from the second control part 160 or the information input from the driving operator 80 so that the brake torque corresponding to the braking operation is output to each wheel. The brake device 210 may include, as a backup, a mechanism for transmitting the oil pressure generated by the operation of the brake pedal included in the driving operator 80 to the cylinder via a master cylinder. Further, the brake device 210 is not limited to the configuration described above, and may be an electronically controlled oil-pressure brake device that controls an actuator according to the information input from the second control part 160 to transmit the oil pressure of the master cylinder to the cylinder.

The steering device 220 includes, for example, a steering ECU and an electric motor. The electric motor, for example, applies a force to the rack and pinion mechanism to change the direction of the steering wheel. The steering ECU drives the electric motor and changes the direction of the steering wheel according to the information input from the second control part 160 or the information input from the driving operator 80.

[Details of the Processing Executed by the Support Part]

When the degree of matching between a first position of the road marking line recognized by the recognition part 130 and a second position of the road marking line obtained by the obtaining part 144 is less than or equal to a first threshold value, the support part 146 suppresses the support of preventing the vehicle M from deviating from the lane. The "suppression" means not providing the above-mentioned support, reducing the degree of support (degree of control), or delaying the timing of the support more than usual. The "suppression" may mean not performing the alarm output, reducing the degree of the alarm output, or delaying the timing of the alarm output more than usual. In the following description, as an example, the suppression is described as not providing the support.

In the first embodiment, in the automatic driving vehicle, when the driver operates the steering wheel and the vehicle M is traveling, and when the driver does not operate the steering wheel but grips the steering wheel and the vehicle M is traveling, the processing to be described later is executed. Further, when the driver monitors the surroundings of the vehicle M and the driver can quickly drive the vehicle M while the driver does not grip the steering wheel and the vehicle M controls the steering, the processing to be described later may be executed. Further, in the following description, it is assumed that the matching of the matching processing is established.

Whether the support can be operated will be described with reference to FIGS. 5 to 7. FIG. 5 is a diagram for illustrating conditions for whether the support can be operated. FIGS. 6 and 7 are diagrams showing the degree of matching between the position of the recognized road marking line and the position of the road marking line in the road marking line information, and the usage mode of the information. The degree of matching will be described with reference to FIGS. 8 to 10 described later.

In (1) to (4), it is assumed that the road marking line on the left side and the road marking line on the right side are recognized by the recognition part 130. Hereinafter, for the road marking lines recognized by the recognition part 130, "(recognition)" is added after the road marking lines, and for the road marking lines obtained from the road marking line information 63, "(map)" is added after the road marking lines.

(1) When the degree of matching between the position of the road marking line (recognition) on the left side and the position of the road marking line (map) on the left side is greater than or equal to a threshold value, and the degree of matching between the position of the road marking line (recognition) on the right side and the position of the road marking line (map) on the right side is greater than or equal to a threshold value, the support part 146 provides a support for preventing the vehicle M from deviating from the road marking line on the left side (hereinafter referred to as the "left side support"), and provides a support for preventing the vehicle M from deviating from the road marking line on the right side (hereinafter referred to as the "right side support"). Since it is estimated that the reliability of the left and right road marking lines (recognition) is high, the left side support and the right side support are executed.

(2) When the degree of matching between the position of the road marking line (recognition) on the left side and the position of the road marking line (map) on the left side is greater than or equal to the threshold value, and the degree of matching between the position of the road marking line (recognition) on the right side and the position of the road marking line (map) on the right side is less than the threshold value, the support part 146 executes the left side support and does not execute the right side support. Since the position of the road marking line (recognition) on the left side and the position of the road marking line (map) on the left side match, it is estimated that the reliability of the road marking line information (recognition) on the left side is high and that the reliability of the road marking line (recognition) on the right side is low. Therefore, the left side support of the side whose reliability is guaranteed is executed.

(3) When the degree of matching between the position of the road marking line (recognition) on the left side and the position of the road marking line (map) on the left side is less than the threshold value, and the degree of matching between the position of the road marking line (recognition) on the right side and the position of the road marking line (map) on the right side is greater than or equal to the threshold value, the support part 146 does not execute the left side support and executes the right side support. Since the position of the road marking line (recognition) on the right side and the position of the road marking line (map) on the right side match, it is estimated that the reliability of the road marking line (recognition) on the right side is high and that the reliability of the road marking line (recognition) on the left side is low. Therefore, the right side support of the side whose reliability is guaranteed is executed.

The processing of (2) or (3) described above is an example of the processing of "when the degree of matching between the first position and the second position is less than or equal to the first threshold value, suppressing the execution of the support processing of providing the support for preventing the vehicle from deviating from the road marking line on the first side." Further, the processing of (2) or (3) described above is an example of the processing of "when the degree of matching between the first position and the second position is less than or equal to the first threshold value, and the degree of matching between the third position and the fourth position is greater than or equal to the second threshold value, not executing the support processing of providing the support for preventing the vehicle from deviating from the road marking line on the first side; and when the probability that the vehicle deviates from the third road marking line on the second side is greater than or equal to a predetermined degree, executing the support processing of providing the support for preventing the vehicle from deviating from the third road marking line based on the third road marking line."

(4) When the degree of matching between the position of the road marking line (recognition) on the left side and the position of the road marking line (map) on the left side is less than the threshold value, and the degree of matching between the position of the road marking line (recognition) on the right side and the position of the road marking line (map) on the right side is less than the threshold value, the support part 146 executes the left side support and the right side support. When the positions of the left and right road marking lines (recognition) and the positions of the left and right road marking lines (map) do not match, it is estimated that the reliability of the road marking line information (map) is low. For example, it is assumed that the road marking lines have been redrawn and that information such as the positions of the redrawn road marking lines are not reflected in the road marking line information 63. In this case, since it is estimated that the reliability of the left and right road marking lines (recognition) is high, the road marking lines (recognition) whose reliability is guaranteed are referred to, and the left side support and the right side support are executed.

The processing of (4) described above is an example of the processing of "when the degree of matching between the first position and the second position is less than or equal to the first threshold value, and the degree of matching between the third position and the fourth position is less than or equal to the second threshold value, executing the support processing of providing the support for preventing the vehicle from deviating from the first road marking line based on the first road marking line, and executing the support processing of providing the support for preventing the vehicle from deviating from the third road marking line based on the third road marking line."

In this way, when the recognition part 130 recognizes the left and right road marking lines, the support part 146, when determining that the degree of matching of one of the road marking lines is less than the threshold value, does not execute the support of the side determined to be less than the threshold value, and, when determining that the degree of matching of both road marking lines is less than the threshold value, executes the left side support and the right side support with reference to the road marking lines (recognition).

In (5) to (7), the presence or absence of the road marking lines (maps) and the degree of matching are not taken into consideration.

(5) When the road marking line on the right side is not recognized by the recognition part 130 and the road marking line on the left side is recognized by the recognition part 130, the support part 146 does not execute the right side support for the road marking line on the right side not recognized by the recognition part 130. The support part 146 executes the left side support based on the road marking line (recognition) on the left side ((5A) and (5B) in FIG. 7).

(6) When the road marking line on the left side is not recognized by the recognition part 130 and the road marking line on the right side is recognized by the recognition part 130, the support part 146 does not execute the left side support for the road marking line on the left side not recognized by the recognition part 130. The support part 146 executes the right side support based on the road marking line (recognition) on the right side ((6A) and (6B) in FIG. 7).

(7) When the road marking line on the left side and the road marking line on the right side are not recognized by the recognition part 130, the support part 146 does not execute the right side support and the left side support.

As described above, when the recognition part 130 does not recognize at least one road marking line, the support part 146 does not execute the support of the side that is not recognized.

When the road marking lines on both sides are recognized by the recognition part 130 as in (1) to (4) above, the support part 146 uses the positions of the road marking lines obtained from the map information in addition to the recognition results of the recognition part 130 to execute the support processing of providing the support for preventing the vehicle M from deviating from the road marking lines. When not the road marking lines on both sides are recognized by the recognition part 130 as in (5) to (7) above, the support part 146 does not use the information on the road marking lines obtained from the map information, but uses the recognition results of the recognition part 130 to execute the support processing of providing the support for preventing the vehicle M from deviating from the road marking line. In this way, appropriate control can be realized according to the recognition results of the recognition part 130.

[Determination of the Degree of Matching Between the Recognized Road Marking Line and the Road Marking Line in the Road Marking Line Information]

The support part 146, for example, determines the degree of matching between the position of the road marking line (recognition) and the position of the road marking line (map) based on the difference between the azimuth of the position of the road marking line (recognition) and the azimuth of the position of the road marking line (map), the angle formed by the road marking line (recognition) and the road marking line (map), and the lateral distance between the road marking line (recognition) and the road marking line (map). The support part 146 determines the degree of matching using the results of one or more of the processing (A) to processing (C) shown in FIGS. 8 to 11.

Regarding (A)

Figure 8:
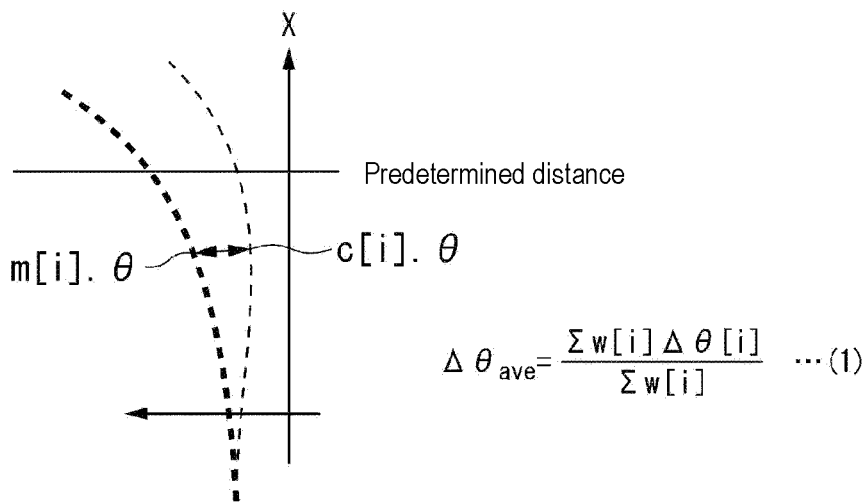
FIG. 8 is a diagram showing an example of the content of the processing related to (A) used for determining the degree of matching.

FIG. 8 is a diagram showing an example of the content of the processing related to (A). The support part 146 calculates the azimuth difference. The support part 146 sets sampling points (sampling points 1, 2, 3 . . . ) in order on the road marking line (recognition) and the road marking line (map) with the vehicle M as the reference, and extracts corresponding sampling points on the road marking line (recognition) and the road marking line (map) from the sampling points. The corresponding sampling points are sampling points in the same order (for example, (m[i], θ), (c[i], θ)).

The support part 146 calculates the azimuth difference for each corresponding sampling point. The reference of the azimuth is, for example, the traveling direction of the vehicle M (in the figure, the X direction). For example, the support part 146 uses the difference between the traveling direction of the vehicle M and the line segment connecting the target sampling point and the sampling point immediately before the target sampling point as the azimuth difference. The difference is calculated from the vehicle M to a position at a predetermined distance.

As shown in the equation (1), the support part 146 divides the total of the azimuth differences ($\Sigma w[i]\Delta\theta[i]$) for each corresponding sampling point by the number of corresponding sampling points ($\Sigma w[i]$) to calculate the average difference ($\Delta\theta_{ave}$). The azimuth difference for each corresponding sampling point may be weighted based on the position of the sampling point. For example, the azimuth differences of the sampling points near the vehicle M may be given a heavier weight than the azimuth differences of the sampling points far from the vehicle M.

[Equation 1]

$$\Delta\theta_{ave} = \frac{\sum w[i]\Delta\theta[i]}{\sum w[i]} \quad (1)$$

Regarding (B)

Figure 9:
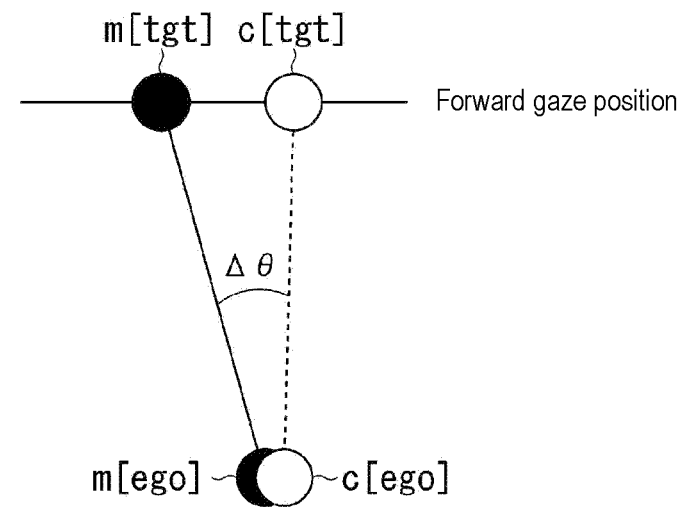
FIG. 9 is a diagram showing an example of the content of the processing related to (B) used for determining the degree of matching.

FIG. 9 is a diagram showing an example of the content of the processing related to (B). The support part 146 calculates the forward gaze angle difference. The support part 146 sets the forward gaze position and calculates the difference in the forward gaze angle, which is the angle formed by a first line segment and a second line segment. The first line segment is a line segment connecting a first predetermined position of the road marking line (recognition) at the set forward gaze position and the road marking line (recognition) at a current second predetermined position (or on the front side of the front gaze position) of the vehicle M. The second line segment is a line segment connecting a third predetermined position of the road marking line (map) at the set forward gaze position and the road marking line (map) at a current fourth predetermined position (or on the front side of the front gaze position) of the vehicle M. The second predetermined position and the fourth predetermined position are, for example, the same position.

Regarding (C)

Figures 10, 11:
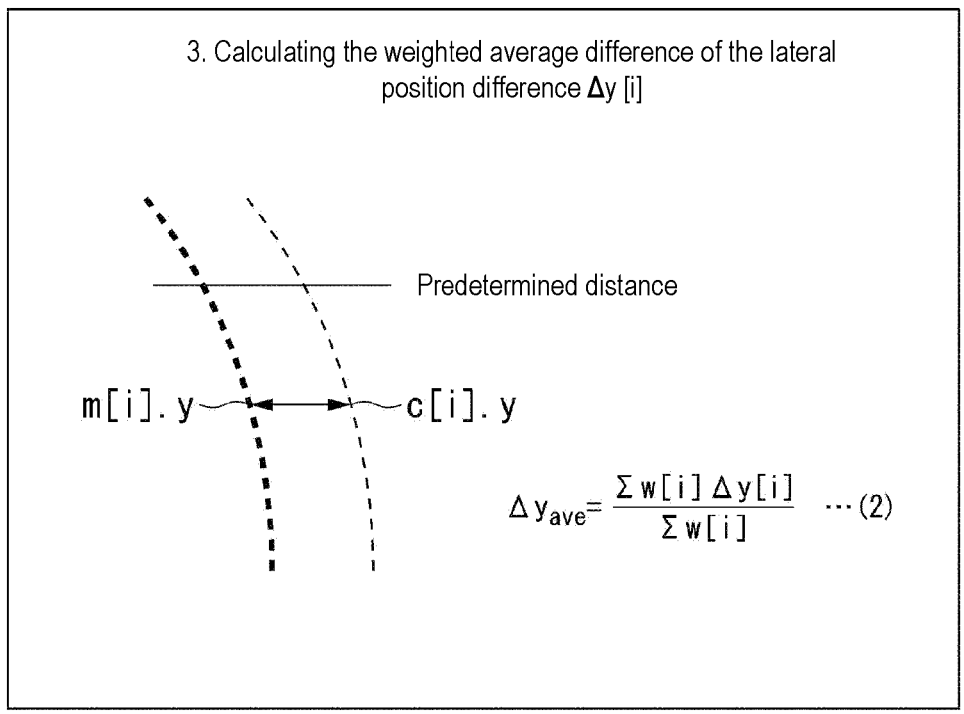
FIG. 10 is a diagram showing an example of the content of the processing related to (C) used for determining the degree of matching.
FIG. 11 is a diagram showing an example of a matching condition and a non-matching condition between the position of the road marking line (recognition) and the position of the road marking line (map).

FIG. 10 is a diagram showing an example of the content of the processing related to (C). The support part 146 calculates the lateral position difference (for example, the difference between (m[i], y) and (c[i], y)). The support part 146 may set sampling points and extract corresponding sampling points in the same manner as in (A) above, and calculate the lateral difference for each corresponding sampling point. The position of the target for which the difference is to be obtained may be a position at a predetermined distance as in (A) above, or may be a different position.

As shown in the equation (2), the support part 146 divides the total of the lateral position differences ($\Sigma w[i]\Delta y[i]$) by the number of lateral positions ($\Sigma w[i]$) for which the differences are calculated to calculate the average difference ($\Delta y_{ave}$). The lateral position difference may be weighted. For example, the differences in the lateral positions near the vehicle M may be given a heavier weight than the differences in the lateral positions far from the vehicle M.

[Equation 2]

$$\Delta y_{ave} = \frac{\sum w[i]\Delta y[i]}{\sum w[i]} \quad (2)$$

The support part 146 determines whether the road marking line (recognition) and the road marking line (map) match by using the azimuth difference, the forward gaze angle difference, or the lateral position difference. For example, the support part 146 compares each of the azimuth difference, the forward gaze angle difference, or the lateral position difference with the threshold value corresponding to each, and determines whether the road marking line (recognition) and the road marking line (map) match based on the comparison result.

FIG. 11 is a diagram showing an example of a matching condition and a non-matching condition between the position of the road marking line (recognition) and the position of the road marking line (map). After it has been determined last time that the position of the road marking line (recognition) and the position of the road marking line (map) do not match (being less than the threshold value), this time, the condition for determining that the position of the road marking line (recognition) and the position of the road marking line (map) match (being greater than or equal to the threshold value) is that all or part of the following condition a to condition c are satisfied.

The condition a is that the azimuth difference (weighted average of the azimuth differences) is less than or equal to a threshold angle θ1. The condition b is that the forward gaze angle difference (difference in the forward gaze angle) is less than or equal to a threshold angle θ2. The condition c is that the lateral position difference (weighted average of the lateral position differences) is less than or equal to a threshold distance d1. The threshold distance d1 is a distance corresponding to 26 (standard deviation) of the distribution of the error between the road marking line (recognition) and the road marking line (map) that is experimentally obtained.

After it has been determined last time that the position of the road marking line (recognition) and the position of the road marking line (map) match, this time, the condition for determining that the position of the road marking line (recognition) and the position of the road marking line (map) do not match is that all or part of the following condition d to condition f are satisfied.

The condition d is that the azimuth difference (weighted average of the azimuth differences) is greater than a threshold angle θ3. The condition e is that the forward gaze angle difference (difference in the forward gaze angle) is greater than a threshold angle θ4. The condition f is that the lateral position difference (weighted average of the lateral position differences) is greater than a threshold distance d2.

For example, the threshold angle θ1 and the threshold angle θ2 may be the same angle or may be different angles. For example, the threshold angle θ3 and the threshold angle θ4 may be the same angle or may be different angles. The threshold angle θ1 and the threshold angle θ2 are, for example, angles less than or equal to the threshold angle θ3 or the threshold angle θ4. The threshold distance d1 is, for example, a distance less than or equal to the threshold distance d2.

Further, the support part 146 may compare one or two among the azimuth difference, the forward gaze angle difference, or the lateral position difference with the threshold value corresponding to each, and determine whether the road marking line (recognition) and the road marking line (map) match based on the comparison result.

As described above, the support part 146 can more accurately determine whether the road marking line (recognition) and the road marking line (map) match by using the above-mentioned differences.

[Flowchart (1)]

Figure 12:
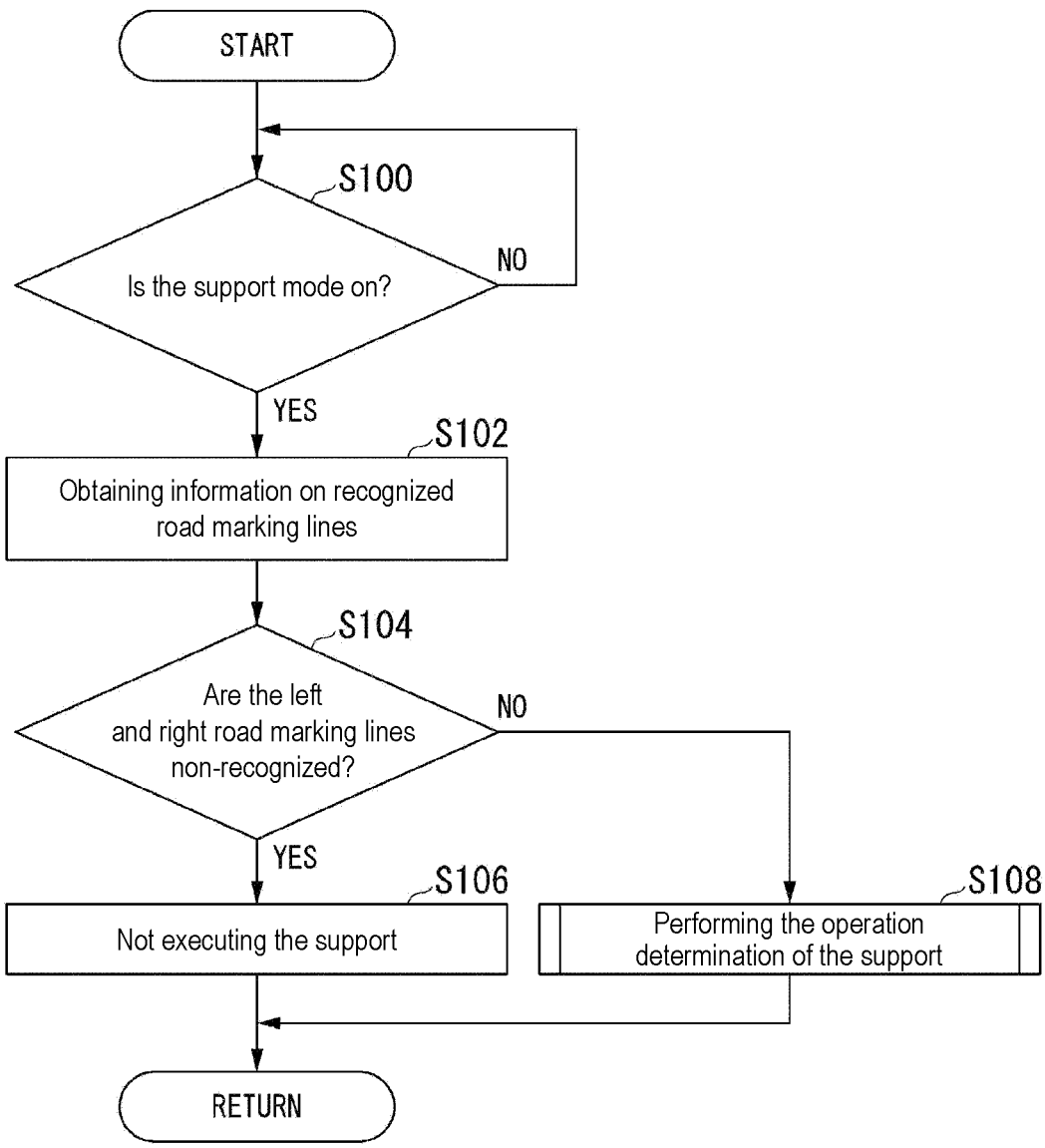
FIG. 12 is a flowchart showing an example of a flow of the processing executed by the support part 146.

FIG. 12 is a flowchart showing an example of a flow of the processing executed by the support part 146. First, the automatic driving control device 100 determines whether the support mode is on (step S100). When the support mode is on, the support part 146 is in a state where it can execute the support.

When the support mode is on, the support part 146 obtains the information on the road marking line recognized by the recognition part 130 (step S102). Next, the support part 146 determines whether the recognition part 130 recognizes the left and right road marking lines based on the information on the road marking line obtained in step S102 (step S104). When the left and right road marking lines are not recognized, the support part 146 does not execute the support (step S106; corresponding to (7) in FIG. 5 and the like). When the left and right road marking lines are recognized, or when one of the left and right road marking lines is recognized, the support part 146 performs the operation determination of the support shown in FIG. 13 (step S108). As a result, the processing of one routine of this flowchart ends.

[Flowchart (2)]

Figure 13:
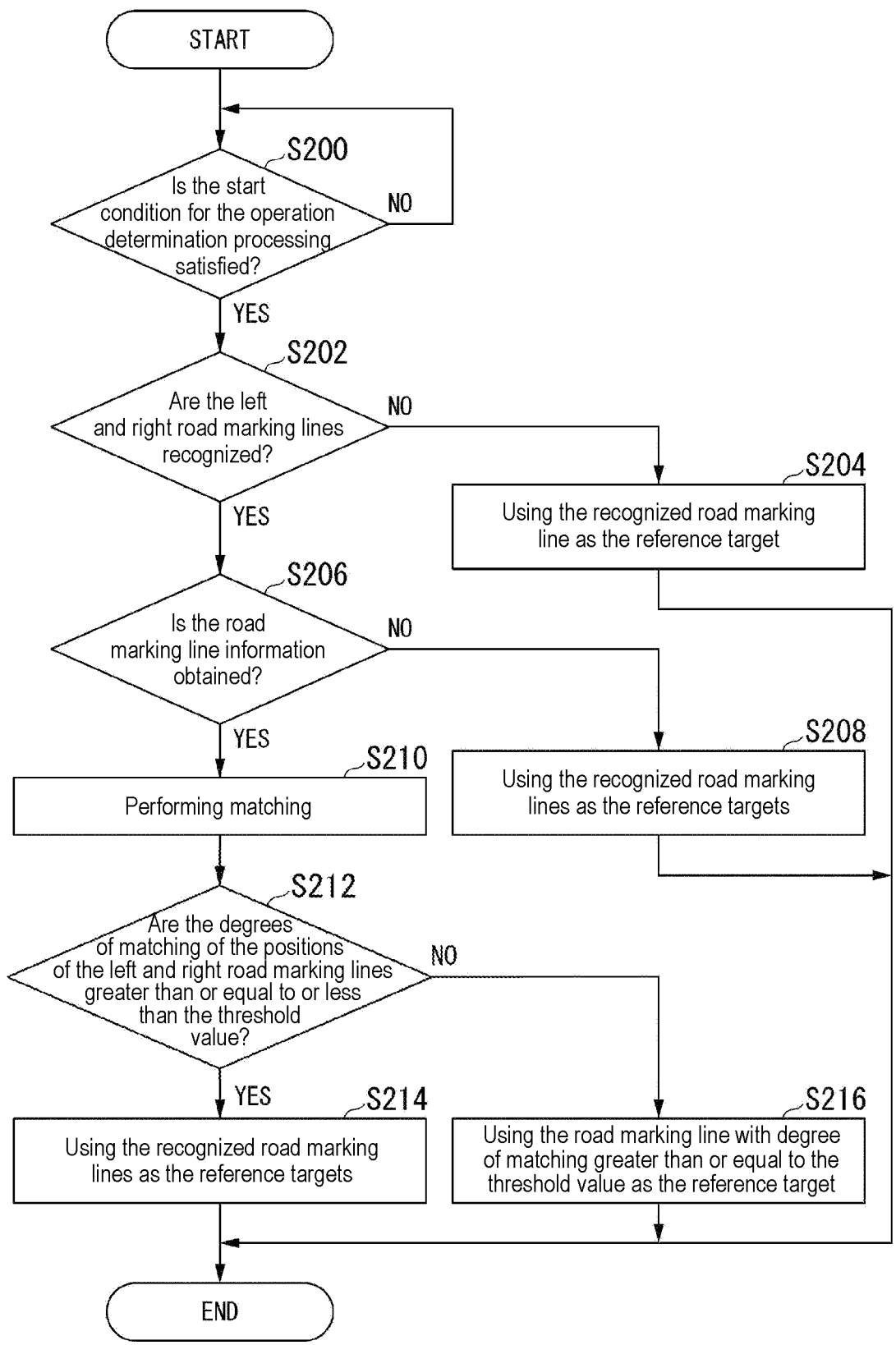
FIG. 13 is a flowchart showing an example of a flow of the processing related to the operation determination executed by the support part 146.

FIG. 13 is a flowchart showing an example of a flow of the processing related to the operation determination executed by the support part 146. First, the support part 146 determines whether the start condition of the operation determination processing is satisfied (step S200). When the start condition of the operation determination processing is satisfied (when it is determined in S104 of FIG. 12 that at least one of the left and right road marking lines is recognized), the support part 146 determines whether the left and right road marking lines are recognized by the recognition part 130 (step S202).

When not both the left and right road marking lines are recognized, the support part 146 uses the recognized road marking line as a reference target (step S204; corresponding to (5) and (6) in FIG. 5 and the like). For example, when the road marking line on the left side is recognized, the road marking line on the left side serves as the reference target, and when the road marking line on the right side is recognized, the road marking line on the right side serves as the reference target. The reference target is a reference target when the support processing is executed. When the probability that the vehicle M deviates from the road marking line on the reference target side is high, the support processing is executed. The support part 146 controls the vehicle M for preventing the vehicle M from deviating from the road marking line serving as the reference target.

When the left and right road marking lines are recognized, the support part 146 determines whether the obtaining part 144 has obtained the information on the position of the vehicle M and the surrounding left and right road marking lines from the road marking line information 63 (step S206). When the information on the left and right road marking lines has not been obtained, the support part 146 uses the recognized road marking lines as the reference targets (step S208). That is, when the obtaining part 144 cannot obtain the information on the road marking lines of the lane (for example, when the information on the road marking lines is not stored in the map information), the support part 146 provides the support for preventing the vehicle M from deviating from the road marking line based on the road marking lines recognized by the recognition part 130.

When the information on the left and right road marking lines is obtained, the support part 146 performs matching on the positions of the recognized road marking lines with the positions of the road marking lines obtained from the road marking line information 63 (step S210). The support part 146 determines whether the degrees of matching between the positions of the recognized left and right road marking lines and the positions of the left and right road marking lines obtained from the road marking line information 63 are greater than or equal to the threshold value, and or whether the degrees of matching are less than the threshold value (step S212). The support part 146 derives the first degree of matching between the position of the road marking line on the left side and the position of the road marking line on the left side obtained from the road marking line information 63, derives the second degree of matching between the position of the road marking line on the right side and the position of the road marking line on the right side obtained from the road marking line information 63, determines whether the first degree of matching is greater than or equal to the threshold value, and determines whether the second degree of matching is greater than or equal to the threshold value.

When the degrees of matching are greater than or equal to the threshold value (the first degree of matching and the second degree of matching are both greater than or equal to the threshold value), or the degrees of matching are less than the threshold value (the first degree of matching and the second degree of matching are both less than the threshold value), the support part 146 uses the recognized road marking lines as the reference targets (step S214; corresponding to (1) and (4) in FIG. 5 and the like).

When not both the degrees of matching are greater than or equal to the threshold value, or not both the degrees of matching are less than the threshold value, the support part 146 uses the road marking line determined to have the degree of matching greater than or equal to the threshold value as the reference target (step S216; corresponding to (2) and (3) in FIG. 5 and the like). In other words, when the degree of matching between the position of the recognized road marking line on the left side and the position of the road marking line on the left side of the road marking line information 63 is greater than or equal to the threshold value, and the degree of matching between the position of the recognized road marking line on the right side and the position of the road marking line on the right side of the road marking line information 63 is less than the threshold value, the recognized road marking line on the left side serves as the reference target. As a result, the processing of this flowchart ends.

As described above, the automatic driving control device 100 can appropriately determine the road marking line (reference target) used for the processing.

[Flowchart (3)]

Figure 14:
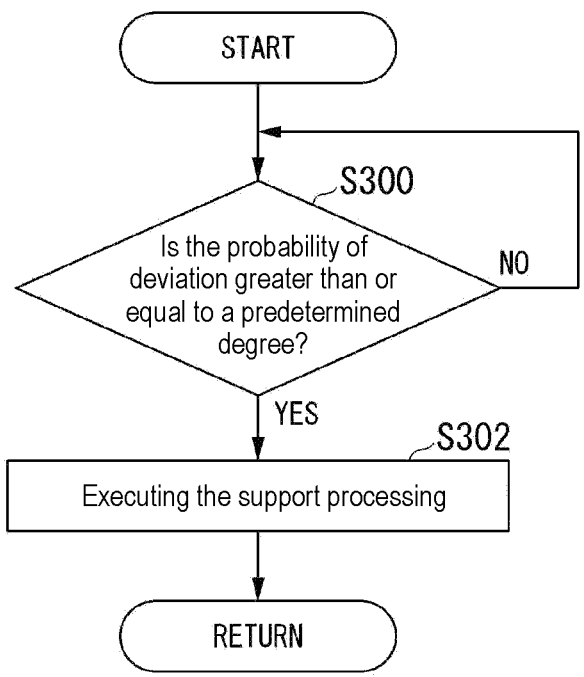
FIG. 14 is a flowchart showing an example of a flow of the processing related to the operation determination executed by the support part 146.

FIG. 14 is a flowchart showing an example of a flow of the processing related to the operation determination executed by the support part 146. First, the support part 146 determines whether the probability that the vehicle M deviates from the road marking line that serves as the reference target (see FIG. 13) is greater than or equal to a predetermined degree (step S300). When the probability of deviation is greater than or equal to the predetermined degree, the support part 146 controls the vehicle M (executes the support processing) for preventing the vehicle M from deviating from the road marking line that serves as the reference target (step S302). As a result, the processing of one routine of this flowchart ends.

As described above, the automatic driving control device 100 can suppress the vehicle M from deviating from the road marking line more appropriately and accurately by executing the support with reference to the road marking line that serves as the reference target.

According to the first embodiment described above, the automatic driving control device 100 can control the vehicle more appropriately by suppressing the execution of the support processing of providing the support for preventing the vehicle from deviating from the road marking line on the first side when the degree of matching between the first position of the recognized first road marking line on the first side and the second position of the second road marking line on the first side is less than or equal to the first threshold value.

Modified Example of the First Embodiment

Hereinafter, a modified example of the first embodiment will be described. In the first embodiment, the processing has been performed using the road marking lines on the first side and the second side, but in the modified example of the first embodiment, the processing is performed using the recognition result of the road marking line where the probability that the vehicle M deviates is high. Hereinafter, the differences from the first embodiment will be mainly described.

Figure 15:
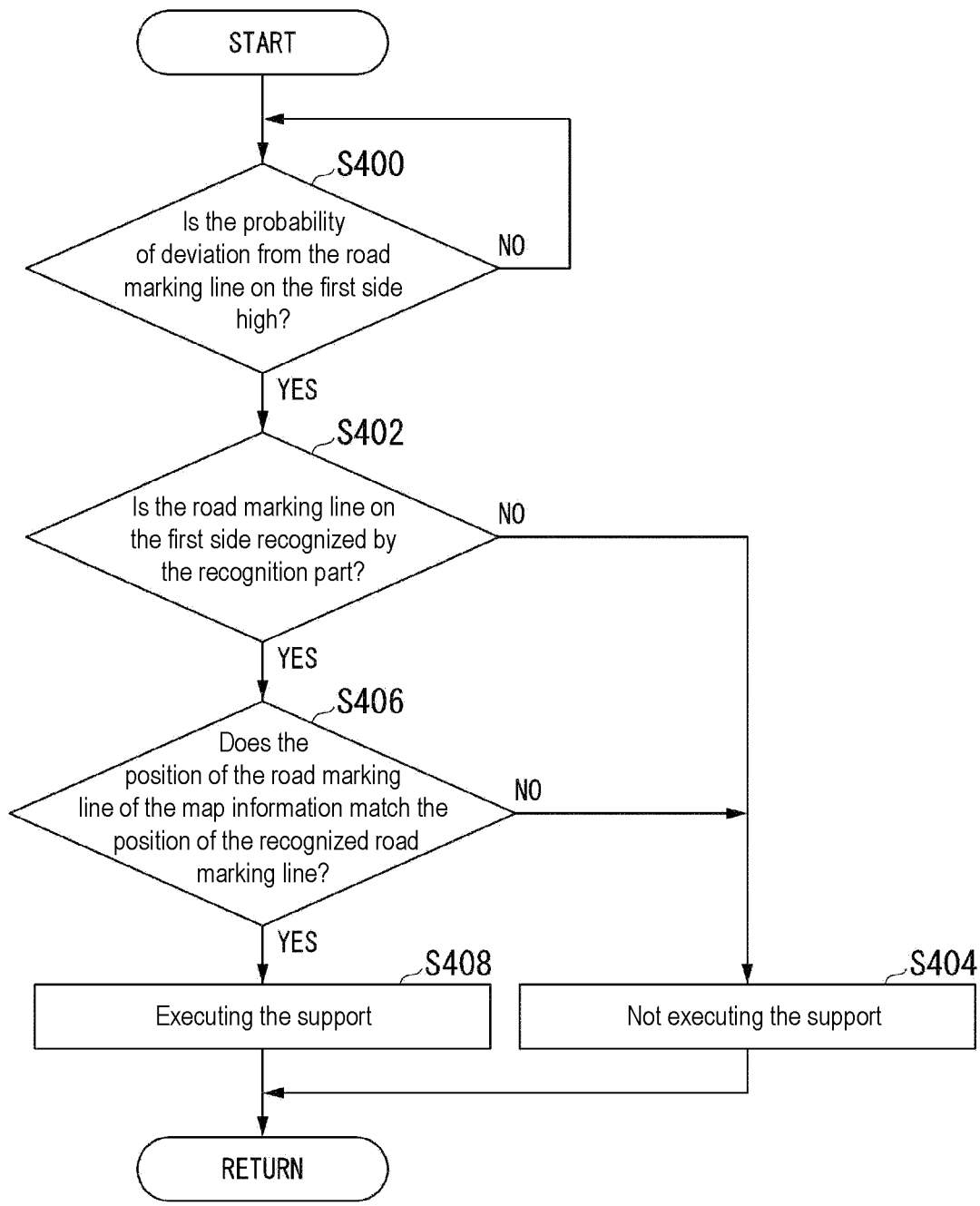
FIG. 15 is a flowchart showing an example of a flow of the processing of a modified example of the first embodiment.

FIG. 15 is a flowchart showing an example of a flow of the processing of a modified example of the first embodiment. First, the support part 146 determines whether the probability that the vehicle M deviates from the road marking line on the first side is high (step S400). When the probability that the vehicle M deviates from the road marking line on the first side is high, the support part 146 determines whether the road marking line on the first side is recognized by the recognition part 130 (step S402). When the road marking line on the first side is not recognized, the support part 146 does not execute the support for suppressing the vehicle M from deviating from the first side (step S404).

When the road marking line on the first side is recognized, the support part 146 determines whether the position of the road marking line on the first side of the road marking line information (map information) and the position of the recognized road marking line match (step S406). When the position of the road marking line on the first side of the road marking line information and the position of the recognized road marking line do not match, the processing proceeds to step S404.

When the position of the road marking line on the first side of the road marking line information and the position of the recognized road marking line match, the support part 146 provides the support for suppressing the vehicle M from deviating from the first side (step S408). As a result, the processing of one routine of this flowchart ends.

In the above processing, when the road marking line information on the recognized road marking line does not exist, the support part 146 provides the support for suppressing the vehicle M from deviating from the first side based on the position of the recognized road marking line.

The above example describes the processing when the probability that the vehicle M deviates from the road marking line on the first side is high, but similarly, the same processing is performed for the road marking line on the second side when the probability that the vehicle M deviates from the road marking line on the second side is high.

According to the modified example of the first embodiment described above, the same effect as that of the first embodiment is obtained.

In the above-described embodiments, the automatic driving control device 100 executes various kinds of processing, but a support device that supports the driving of the occupant may perform the processing executed by the support part 146 described in the above-described embodiment. For example, when the driver operates or grips the steering wheel, the support device controls the steering to support the driver's driving, and when the degree of matching between the first position of the first road marking line on the first side recognized by the recognition part 130 and the second position of the second road marking line on the first side obtained by the obtaining part 144 is less than or equal to the first threshold value, the support device suppresses the execution of the support processing of providing the support for preventing the vehicle M from deviating from the road marking line on the first side.

[Hardware Configuration]

Figure 16:
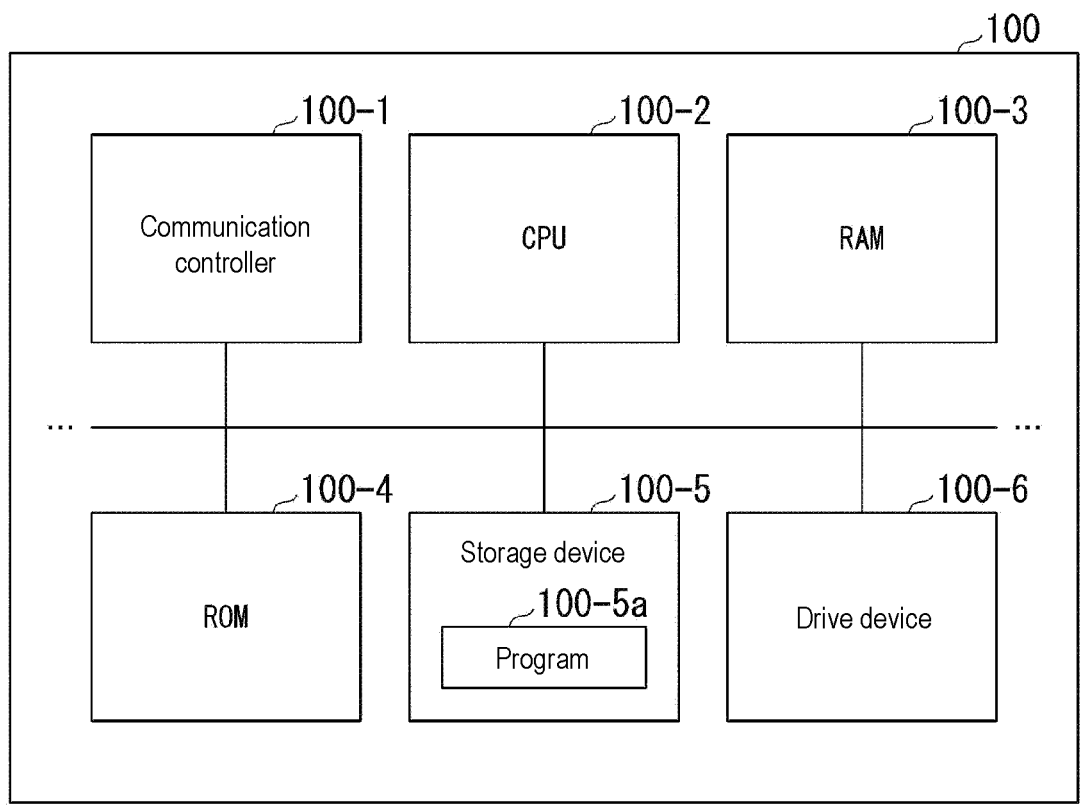
FIG. 16 is a diagram showing an example of a hardware configuration of the automatic driving control device 100 (the support device 100A) of the embodiment.

FIG. 16 is a diagram showing an example of a hardware configuration of the automatic driving control device 100 (the support device 100A) of the embodiment. As shown in the figure, the automatic driving control device 100 has a configuration in which a communication controller 100-1, a CPU 100-2, a random access memory (RAM) 100-3 used as a working memory, a read only memory (ROM) 100-4 for storing a boot program and the like, a storage device 100-5 such as a flash memory and or a hard disk drive (HDD), a drive device 100-6, and the like are connected to one another by an internal bus or a dedicated communication line. The communication controller 100-1 communicates with a component in addition to the automatic driving control device 100. The storage device 100-5 stores a program 100-5*a* to be executed by the CPU 100-2. This program is expanded in the RAM 100-3 by a direct memory access (DMA) controller (not shown) or the like, and is executed by the CPU 100-2. In this way, a part or all of the first control part 120, the second control part 160, and the functional parts included therein are realized.

The embodiment described above can be expressed as follows.

A vehicle control device includes:
a storage device that stores a program; and
a hardware processor;
when the hardware processor executes the program stored in the storage device, it is made to:

recognize a first road marking line on a first side of a lane in which a vehicle travels from an image photographed by a photographing part that photographs surroundings of the vehicle;

obtain information on a second road marking line on the first side of the lane in which the vehicle travels from map information;

execute a support processing of providing a support for preventing the vehicle from deviating from a road marking line when a probability that the vehicle deviates from the road marking line is greater than or equal to a predetermined degree; and when a degree of matching between a first position of the recognized first road marking line on the first side and a second position of the obtained second road marking line on the first side is less than or equal to a first threshold value, suppress execution of the support processing of providing the support for preventing the vehicle from deviating from a road marking line on the first side.

Although embodiments for implementing the disclosure have been described above by the embodiments, the disclosure is not limited to these embodiments, and various modifications and replacements may be added without departing from the spirit of the disclosure.

What is claimed is:

1. A vehicle control device, comprising:
a storage device, and
a hardware processor coupled to the storage device and configured at least to:
recognize a first road marking line on a first side of a lane in which a vehicle travels from an image photographed by a photographing part which is one of a camera, a radar, or a light detection and ranging (LIDAR) device that photographs surroundings of the vehicle;
obtain information on a second road marking line on the first side of the lane in which the vehicle travels from map information; execute a process of preventing the vehicle from deviating from a road marking line when a probability that the vehicle deviates from the road marking line is greater than or equal to a predetermined degree;
suspend the process of preventing the vehicle from deviating from the road marking line on the first side when a degree of matching between a first position of the first road marking line on the first side which has been recognized from the image photographed by the photographing part and a second position of the second road marking line on the first side obtained from the map information is less than or equal to a first threshold value;
recognize a third road marking line which is on a second side opposite to the first side of the lane and obtained from the photographing part;
obtain information on a fourth road marking line on the second side from the map information;
suspend the process of preventing the vehicle from deviating from the road marking line from the road marking line on the first side when the degree of matching between the first position of the first road marking line on the first side and the second position of the second road marking line on the first side is less than or equal to the first threshold value, and a degree of matching between a third position of the third road marking line on the second side and a fourth position of the fourth road marking line on the second side is greater than or equal to a second threshold value;

when a probability that the vehicle deviates from the third road marking line on the second side is greater than or equal to a predetermined degree, the hardware processor is configured to control the vehicle to prevent the vehicle from deviating from the third road marking line based on the third road marking line; and when the hardware processor cannot obtain the information on any road marking line of the lane from the map information, the hardware processor is configured to control the vehicle to prevent the vehicle from deviating from the road marking line based on the road marking line recognized from the image photographed by the photographing part.

2. The vehicle control device according to claim 1, wherein the hardware processor is further configured to:
recognize one or both of the first road marking line on the first side and a third road marking line on a second side opposite to the first side of the lane,
obtain one or both of the information on the second road marking line on the first side and information on a fourth road marking line on the second side from the map information,
when the hardware processor recognizes the first road marking line and the third road marking line, the hardware processor is configured to use the second position of the second road marking line or a fourth position of the fourth road marking line in addition to a recognition result of the first road marking line and the third road marking line to execute the process of preventing the vehicle from deviating from the road marking line, and
when the hardware processor does not recognize the first road marking line, the hardware processor is not configured to use the second position of the second road marking line or the fourth position of the fourth road marking line and uses the recognition result of the third road marking line which has been recognized from the image photographed by the photographing part to execute the process of preventing the vehicle from deviating from the road marking line, when the hardware processor does not recognize the third road marking line but recognizes the first road marking line, the processor is not configured to use the fourth position of the second road marking line and uses the recognition result of the first road marking line to execute the support of providing the support for preventing the vehicle from deviating from the road marking line.

3. The vehicle control device according to claim 1, wherein the hardware processor is configured to determine the degree of matching between the first position of the first road marking line and the second position of the second road marking line based on a difference between an azimuth of the first position and an azimuth of the second position, an angle formed by the first road marking line and the second road marking line, and a lateral distance between the first road marking line and the second road marking line.

4. A vehicle control method, wherein a computer comprises a storage device, and a hardware processor coupled to the storage device and configured to execute:
recognizing a first road marking line on a first side of a lane in which a vehicle travels from an image photographed by a photographing part which is one of a camera, a radar, or a light detection and ranging (LIDAR) device that photographs surroundings of the vehicle;

obtaining information on a second road marking line on the first side of the lane in which the vehicle travels from map information;

executing a process of preventing the vehicle from deviating from a road marking line when a probability that the vehicle deviates from the road marking line is greater than or equal to a predetermined degree;

suspending the process of preventing the vehicle from deviating from the road marking line from the road marking line on the first side when a degree of matching between a first position of the recognized first road marking line on the first side from the image photographed by the photographing part and a second position of the obtained second road marking line on the first side is less than or equal to a first threshold value;

recognizing a third road marking line on a second side opposite to the first side of the lane;

obtaining information on a fourth road marking line on the second side from the map information;

suspending the process of preventing the vehicle from deviating from the road marking line from the road marking line on the first side when the degree of matching between the first position of the first road marking line on the first side and the second position of the second road marking line on the first side is less than or equal to the first threshold value, and a degree of matching between a third position of the third road marking line on the second side and a fourth position of the fourth road marking line on the second side is greater than or equal to a second threshold value;

having detected by the hardware processor that a probability that the vehicle deviates from the third road marking line on the second side is greater than or equal to a predetermined degree, controlling the vehicle to prevent the vehicle from deviating from the third road marking line based on the third road marking line; and having detected by the hardware processor that the hardware processor cannot obtain the information on any road marking line of the lane from the map information, controlling the vehicle to prevent the vehicle from deviating from the road marking line based on the road marking line recognized from the image photographed by the photographing part.

5. A non-transitory computer-readable recording medium recording a program, wherein a computer is made to perform:

a processing of recognizing a first road marking line on a first side of a lane in which a vehicle travels from an image photographed by a photographing part which is one of a camera, a radar, or a light detection and ranging (LIDAR) device that photographs surroundings of the vehicle;

a processing of obtaining information on a second road marking line on the first side of the lane in which the vehicle travels from map information;

a processing of executing a process of preventing the vehicle from deviating from a road marking line when a probability that the vehicle deviates from the road marking line is greater than or equal to a predetermined degree;

a processing of suspending the process of preventing the vehicle from deviating from the road marking line from the road marking line on the first side when a degree of matching between a first position of the recognized first road marking line on the first side from the image photographed by the photographing part and a second position of the obtained second road marking line on the first side is less than or equal to a first threshold value;

a processing of recognizing a third road marking line on a second side opposite to the first side of the lane;

a processing of obtaining information on a fourth road marking line on the second side from the map information;

a processing of suspending the process of preventing the vehicle from deviating from the road marking line from the road marking line on the first side when the degree of matching between the first position of the first road marking line on the first side and the second position of the second road marking line on the first side is less than or equal to the first threshold value, and a degree of matching between a third position of the third road marking line on the second side and a fourth position of the fourth road marking line on the second side is greater than or equal to a second threshold value;

having detected by the hardware processor that a probability that the vehicle deviates from the third road marking line on the second side is greater than or equal to a predetermined degree, a processing of controlling the vehicle to prevent the vehicle from deviating from the third road marking line based on the third road marking line; and having detected by the hardware that hardware processor cannot obtain the information on any road marking line of the lane from the map information, a processing of controlling the vehicle to prevent the vehicle from deviating from the road marking line based on the road marking line recognized from the image photographed by the photographing part.

* * * * *